(No Model.)

F. F. HUSSEY.
DOUGH MIXER.

No. 297,518.      Patented Apr. 22, 1884.

Witnesses:
Harry E. Remick
L. J. White

Inventor:
Francis F. Hussey,
Per C. C. Shaw,
Atty.

UNITED STATES PATENT OFFICE.

FRANCIS F. HUSSEY, OF NEWTON, MASSACHUSETTS.

DOUGH-MIXER.

SPECIFICATION forming part of Letters Patent No. 297,518, dated April 22, 1884.

Application filed July 17, 1883. (No model.)

*To all whom it may concern:*

Be it known that I, FRANCIS F. HUSSEY, of Newton, in the county of Middlesex, State of Massachusetts, have invented a certain new and useful Improvement in Dough-Mixers, of which the following is a description sufficiently full, clear, and exact to enable any person skilled in the art or science to which said invention appertains to make and use the same, reference being had to the accompanying drawings, forming a part of this specification, in which—

Figure 1:
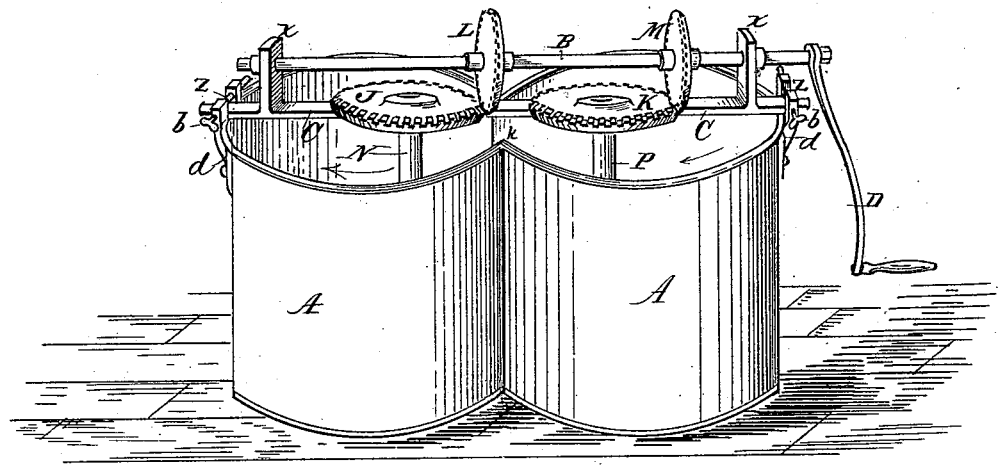
Figure 2:
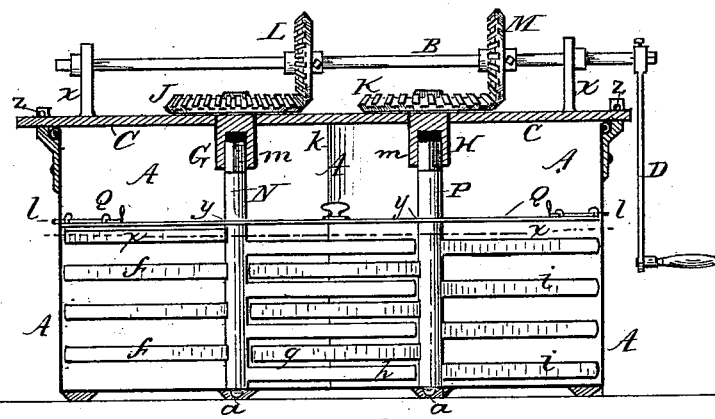

Figure 1 is an isometrical perspective view of my improved mixer; Fig. 2, a vertical longitudinal section, and Fig. 3 a vertical transverse section taken on the line $x\,x$ in Fig. 2.

Like letters of reference indicate corresponding parts in the different figures of the drawings.

My invention relates to that class of dough-mixers which are designed for domestic use; and it consists in a novel construction and arrangement of the parts, as hereinafter more fully set forth and claimed, by which a cheaper, simpler, and more effective device of this character is produced than is now in ordinary use.

The nature and operation of the improvement will be readily understood by all conversant with such matters from the following explanation, its extreme simplicity rendering an elaborate description unnecessary.

In the drawings, A represents the body or tank of the mixer, which may be composed of tin or any other suitable materials, and varied in size to correspond with the quantity of dough which it is desired to mix.

Disposed centrally on the body A, and arranged lengthwise on the same, there is a bar or truss, C, having at either end a standard or upright, $x$, and journaled horizontally in the standards there is a shaft, B, provided at one of its ends with the crank D.

Journaled vertically in the bar C there are two short shafts, G H, carrying, respectively, at their upper ends the horizontally-arranged miter-gears J K, which intermesh with corresponding vertically-arranged miter-gears, L M, on the crank-shaft B. The lower ends of the shafts G H are provided with square sockets $m$, adapted to pass over and receive the squared upper ends of the vertically-arranged shafts N P, the lower ends of which rest in steps $a\,a$ in the bottom of the tank.

Projecting horizontally from one side of the shaft N there is a series of floats or arms, $f$, and from its opposite side a corresponding series of arms, $g$, the arms on the opposite sides of the shaft being arranged alternately, or in such a manner that the arms $g$ stand exactly opposite the spaces between the arms $f$.

The shaft P is provided with floats or arms $h\,i$, arranged in the same manner as the floats on the shaft N, or so that the arms $h$ stand opposite the spaces between the arms $i$.

Attached to the top of the body A there are two clips or holders, $d$, slotted at their upper ends, as seen at $z$, the ends of the bar C being inserted in the slots and secured by the pins $b$.

A guard, Q, is inserted in the body A, and secured in a horizontal position immediately over the floats of the shafts N P by means of a pin or catch, $l$, at either end. The guard is preferably composed of a strip of tin or sheet metal three or four inches in width, being corrugated to prevent it from bending, and provided with holes at $y$ for receiving the shafts N P, which fit loosely in the holes.

Figure 3:
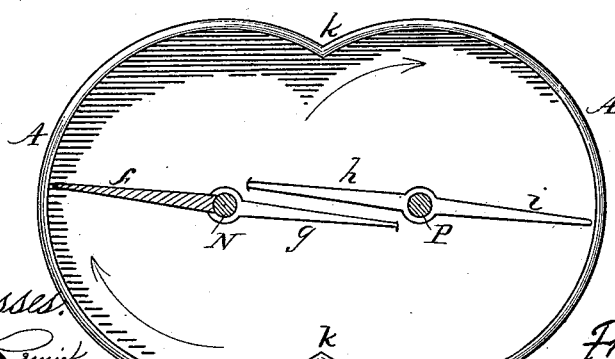

The shape of the body in cross-section is best seen in Fig. 3, its length being greater than its width, its ends rounded, and its sides curved inwardly, as seen at $k$. The body may be said to consist of two open-top cylinders of equal dimensions so connected as to open into each other at their sides, the distance between the vertical axial lines of the cylinders being equal to one-half of the diameter of either cylinder. The inwardly-projecting portions of the body at $k$ form an important feature of my invention, serving to prevent the dough from accumulating at this point, or at the line of demarkation between the revolving floats, which would be the case if the sides of the body were straight.

The object of the guard Q is to prevent the dough from being crowded upwardly around the shafts and in the center and at the ends of the mixer as the floats revolve, its functions being also important.

In the use of my improvement the shafts N P are first inserted in the steps $a$, after which the guard Q is passed over the shafts, and secured in position by the catches or pins $l$. The bar C, carrying the shaft B and gears J K L M, is then placed in position on the body, the upper ends of the shafts N P being inserted in the sockets m, and the bar secured in the slots z by the pins b. The flour and water or ingredients for forming the dough are next placed in the tank A, and the crank D turned, causing the float-shafts N P to revolve, and the dough to be mixed in a manner which will be readily obvious to all conversant with such matters without a more explicit description.

It will be obvious that when the crank is turned, the gears L M, being disposed on corresponding sides of the gears J K, will revolve the shafts N P in the same direction, thereby causing their adjoining arms to traverse in opposite directions, as indicated by the arrows in Fig. 1, the arms $g\,h$ crossing the longitudinal axial line of the body A between the shafts P N at the same time, as seen in Fig. 2, and the arms $i\,f$ crossing said line in like manner as the shafts continue to revolve.

I do not confine myself to constructing the floats of any special form, or to the special means shown for confining the bar C on the body A. Neither do I confine myself to constructing the gears of any special size, or to the specific means described for coupling the shafts N P to the shafts G H, or securing the guard Q in position, as all of these may be varied as desired without departing materially from the spirit of my invention, which having thus explained,

What I claim is—

1. In a dough-mixer or kneading-machine substantially such as described, the removable truss or bar C, having the standards $x\,x$, and carrying the crank-shaft B, provided with the gears L M, in combination with the gears J K, and vertical shafts G H, having the sockets $m$, for receiving the float-shafts N P, the gears L M being respectively arranged on corresponding sides of the gears J K, whereby the float-shafts are caused to revolve in the same direction and their intermeshing floats to move in opposite directions, and said bar may be readily removed from the body of the machine without removing the float-shafts, substantially as set forth.

2. In a dough-mixer or kneading-machine, the guard Q, in combination with the body A, float-shafts N P, means for securing said guard in said body, and operative mechanism for said shafts, substantially as and for the purpose specified.

FRANCIS F. HUSSEY.

Witnesses:
C. A. SHAW,
L. J. WHITE.